US010294102B2

(12) United States Patent
Warta et al.

(10) Patent No.: US 10,294,102 B2
(45) Date of Patent: May 21, 2019

(54) METHOD OF CATALYST REDUCTION IN A HYDROGEN PLANT

(71) Applicants: Andrew M Warta, Wheatfield, NY (US); Troy M Raybold, Colden, NY (US); David R Barnes, Jr., Keene, NH (US)

(72) Inventors: Andrew M Warta, Wheatfield, NY (US); Troy M Raybold, Colden, NY (US); David R Barnes, Jr., Keene, NH (US)

(73) Assignee: PRAXAIR TECHNOLOGY, INC., Danbury, CT (US)

( * ) Notice: Subject to any disclaimer, the term of this patent is extended or adjusted under 35 U.S.C. 154(b) by 28 days.

(21) Appl. No.: 15/379,610

(22) Filed: Dec. 15, 2016

(65) Prior Publication Data

US 2018/0170751 A1 Jun. 21, 2018

(51) Int. Cl.

| | |
|---|---|
| ***C01B 3/40*** | (2006.01) |
| ***B01J 23/755*** | (2006.01) |
| ***B01J 37/16*** | (2006.01) |
| ***B01J 7/02*** | (2006.01) |
| ***C01B 3/38*** | (2006.01) |

(52) U.S. Cl.

CPC .................. *C01B 3/40* (2013.01); *B01J 7/02* (2013.01); *B01J 23/755* (2013.01); *B01J 37/16* (2013.01); *C01B 3/38* (2013.01); *C01B 2203/0233* (2013.01); *C01B 2203/1058* (2013.01); *C01B 2203/1235* (2013.01); *C01B 2203/1241* (2013.01); *C01B 2203/1247* (2013.01); *C01B 2203/1604* (2013.01); *C01B 2203/1623* (2013.01); *Y02P 20/52* (2015.11)

(58) Field of Classification Search

CPC .................................. C01B 3/40; B01J 37/16

See application file for complete search history.

(56) References Cited

U.S. PATENT DOCUMENTS

| | | | |
|---|---|---|---|
| 4,728,506 A | 3/1988 | Habermehl et al. | |
| 6,123,873 A | 9/2000 | Primdahl | |
| 8,163,046 B2 | 4/2012 | Boyer et al. | |
| 2006/0292069 A1 | 12/2006 | Pez et al. | |
| 2008/0197323 A1* | 8/2008 | Farnell | B01J 23/464 252/373 |
| 2015/0151964 A1* | 6/2015 | Kang | C01B 3/384 252/373 |
| 2016/0115021 A1 | 4/2016 | Gronemann et al. | |
| 2016/0122267 A1* | 5/2016 | Jemaa | C07C 29/76 568/913 |
| 2016/0236183 A1* | 8/2016 | Fonseca Bidart | B01J 23/83 |

FOREIGN PATENT DOCUMENTS

| | | |
|---|---|---|
| GB | 1465269 A | 2/1977 |
| WO | 2013061040 A2 | 5/2013 |
| WO | 2014181243 A1 | 11/2014 |
| WO | 2014184022 A1 | 11/2014 |
| WO | WO 2015/054755 * | 4/2015 |

OTHER PUBLICATIONS

Reduction and Start-up of Steam Reforming Catalyst Gerard B. Hawkins pp. 1-15 (Year: 2013).*

* cited by examiner

*Primary Examiner* — Douglas B Call
(74) *Attorney, Agent, or Firm* — Iurie A. Schwartz

(57) ABSTRACT

The present invention relates to a method of reducing a catalyst utilized in a hydrogen plant. More specifically, the invention relates the reduction of a catalyst employed in the steam methane reformer.

12 Claims, 1 Drawing Sheet

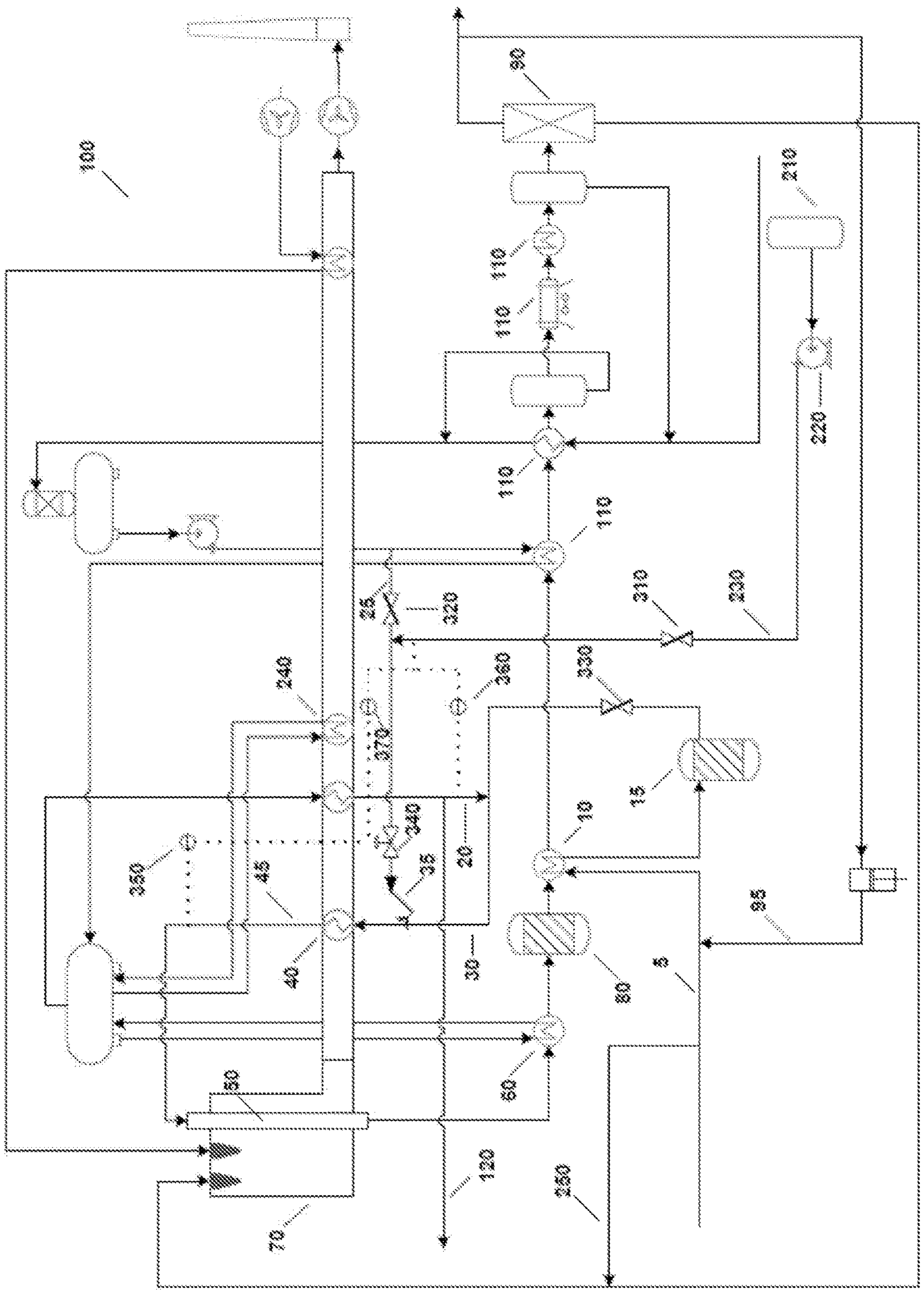
100
90
210
110
110
110
110
220
310
230
25
320
330
360
240
370
340
35
20
10
15
350
45
95
5
40
30
80
60
50
120
250
70

METHOD OF CATALYST REDUCTION IN A HYDROGEN PLANT

BACKGROUND OF THE INVENTION

Field of the Invention

The present invention relates to a method of reducing a catalyst utilized in a hydrogen or syngas plant. More specifically, the invention relates to the reduction of a catalyst employed in the steam methane reformer or pre-reformer, where an oxidized nickel catalyst is reduced to nickel metal prior to the introduction of the primary feedstock into the steam methane reformer/pre-reformer.

Description of Related Art

Hydrocarbons such as natural gas, naphtha, or liquefied petroleum gas (LPG) can be catalytically converted with steam to obtain a synthesis gas (i.e., a mixture of hydrogen (H2) and carbon monoxide (CO), commonly referred to as "syngas"). This so-called steam methane reforming process is well known, and it is typically utilized to obtain syngas which may be ultimately utilized in the production of hydrogen, methanol, ammonia, or other chemicals. The steam methane reformer (SMR) is a furnace having numerous catalyst-containing reformer tubes arranged in parallel rows, and in which the endothermic steam reforming reaction takes place. When starting up the steam methane reformer after the catalyst in the tubes has been replaced, the catalyst in the SMR tubes need to be reduced from its initial oxidized state. The reduction can be achieved by introducing steam and a reduction fluid to the catalyst. At many locations the reduction fluid will be natural gas (i.e., methane) which is the primary feedstock for the hydrogen SMR in normal operation. Alternatively, this reduction fluid can be hydrogen provided from a hydrogen producing facility, an existing pipeline, or supplied in liquid form via tanks and/or tube trailers.

In areas where natural gas or hydrogen are not readily available, and where the plant/SMR utilizes a different feedstock such as light or heavy naphtha, or liquefied petroleum gas, it can be logistically difficult and expensive to find sufficient sources of natural gas or hydrogen for the initial catalyst reduction. Therefore, a different reduction fluid would be desired and necessary.

In places where natural gas and/or hydrogen is not sufficiently abundant for catalytic reduction or as a feedstock, it has been recognized that other reduction fluids such as methanol or ammonia may be utilized. In the related art, and with reference to Great Britain Patent No. 1,465,269, initial reduction of a catalyst via the introduction of methanol and steam into the reactor is disclosed. Likewise, International Application Publication No. WO 2014/184022 discloses the use of methanol for initial catalyst reduction with an emphasis on pre-reformers, as well as hydrogen for desulfurization. Although these documents generally refer to reduction of a catalyst prior to starting up the reforming operation they do not disclose doing so with the process and/or apparatus of the present invention, wherein the reduction fluid is introduced through existing spray quench nozzles that are subsequently employed for temperature control during normal plant operation.

To overcome the disadvantages of the related art, it is an object of the present invention to utilize existing plant equipment within a hydrogen or syngas plant, which is intended for normal plant operations, for the initial catalyst reduction step with alternative reduction fluids like methanol or ammonia. It is another object of the present invention to reduce or outright eliminate the capital expenditures on items such as heat exchangers, tanks, piping, etc., which would only be employed in the initial startup of the plant or during infrequent subsequent catalyst reductions. In addition, this would eliminate the added cost of maintenance for equipment which sees limited use. It is a further object of the invention to extend the process and apparatus of the present invention to other type of reformers, which may include pre-reformers, autothermal reformers and possibly other reactors requiring catalyst reduction.

Other objects and aspects of the present invention will become apparent to one of ordinary skill in the art upon review of the specification, drawings and claims appended hereto.

SUMMARY OF THE INVENTION

According to an aspect of the invention, a method of starting up an integrated hydrogen or syngas plant including a reactor having a catalyst therein, including:

providing a catalyst reduction fluid, and introducing the catalyst reduction fluid into steam stream through liquid spray quench nozzles;

introducing the mixture of catalyst reduction fluid and steam stream and reducing a catalyst disposed within the reactor; and thereafter admitting the reactor feedstock and steam stream into the reactor where the reforming is carried out and wherein liquid water is introduced through the liquid spray quench nozzles as a means of controlling the temperature of the combined reactant feedstock and steam stream.

BRIEF DESCRIPTION OF THE FIGURES

The objects and advantages of the invention will be better understood from the following detailed description of the preferred embodiments thereof in connection with the accompanying FIGURE wherein like numbers denote same features throughout and wherein:

FIG. 1 is a process flow diagram illustrating equipment of an exemplary hydrogen plant for initial startup utilizing methanol, and steady state operation utilizing naphtha as the feedstock.

DETAILED DESCRIPTION OF THE INVENTION

The present invention provides for a method and apparatus of reducing a catalyst employed in the formation of a syngas thereby activating it for reforming. Generally, processes for the reduction of a catalyst, such as nickel-based catalyst, with methanol are discussed in Great Britain Patent No. 1,465,269, the content of which is incorporated by reference in its entirety herein. Alternate reduction fluids, like methanol or ammonia, are used when hydrogen is not readily available and when the primary feedstock cannot be used as a reductant due to the potential for deactivation of the catalyst via coking or other mechanisms. Problematic feedstocks are typically heavier than natural gas, like LPG or naphtha.

Heretofore, utilization of alternative reductants like methanol or ammonia would require dedicated equipment for introducing the reductant to the catalyst. This equipment may include storage vessels, pumps, vaporizers or other heat exchangers, control valves, isolation valves, and all associated piping, instrumentation, and controls. The current invention detailed herein reduces the amount of this dedicated equipment, instead repurposing equipment which has another function during normal operation. Specifically, a spray quench nozzle which is normally used to control the temperature of feed to the inlet of the SMR can be repurposed to introduce methanol for catalyst reduction.

In one exemplary embodiment, the integrated hydrogen plant which is suitable for carrying out the invention may include at least one pre-reformer as well as the SMR. Liquid methanol can be provided by tanker truck into a storage vessel through a transfer pump. The storage vessel is preferably an existing storage vessel designed for a secondary feedstock during normal operation, for instance, LPG, but can be dedicated for this purpose. To ensure the methanol is free of impurities that may damage the reforming or pre-reforming catalyst, it is passed through a filter, for example one using activated carbon to remove the impurities.

The methanol feed pumps raise the pressure of the cleaned liquid methanol to that required for introduction into the steam upstream of the reformer. These pumps may either be designed for this service, or preferably be the same pumps used for elevating the pressure of a secondary feedstock in normal steady state operation, for instance, LPG.

The pumps route the methanol via a line upstream of the SMR to introduce the methanol liquid, mixing with a steam stream, through a spray quench nozzle whose primary purpose in normal steady state operation of the hydrogen plant is to spray liquid water as a means of temperature control. Methanol is injected into the steam stream and evaporates. The minimum steam to methanol molar ratio is 20:1, with methanol flow rate being slowly increased to a desired flow rate. However, generally the steam to methanol ratio is in the range of 20:1-30:1, preferably 20:1-25:1, and most preferably 20:1-23:1. The inlet temperature of the shift reactor is monitored and controlled, with hourly samples taken for analysis of the process condensate. The steam to hydrogen molar ratio at the tube exit should be maintained between 6-8 as hydrogen is generated. As hydrogen production commences at the required purity, it is stored in hydrogen receivers and may be used via hydrogen recycle as the reducing step for future use in, for example, the reduction of desulphurization catalyst.

Thereafter, the normal operation of the integrated hydrogen plant is commenced where the primary feedstock is introduced and methanol introduction from the storage vessels is discontinued. The liquid spray quench nozzles are instead fed by a boiler feed water supply to administer same to the mixed feed as a means of temperature control. For instance, when a lower temperature of the reformer inlet is desired, a higher flow rate of water is sprayed through the spray quench nozzles, where it evaporates and cools the feedstock stream.

With reference to FIG. 1, the initial startup and normal steady state operation of the present invention of an exemplary hydrogen plant is explained.

The initial startup of the integrated process plant 100 typically requires activation of the catalysts employed in the steam methane reactor 70, and potentially other reactors (e.g., pre-reformers). This reactor 70 is typically a tube-filled reactor within a fired furnace. The catalysts provided in the reformer tubes 50 are typically supplied in an oxidized (passivated) state. Activation requires chemical reduction of the reactive metal species (e.g. nickel). This reduction can be achieved during initial startup through use of a reduction fluid like methanol.

The initial startup procedure is known to one skilled in the art. Typically, the process lines are prepared, purged, and heated. The burners of the steam methane reforming reactor 70 are fired using a primary fuel 250, such as naphtha. Steam is generated in boilers 60 and 240 and fed to the steam methane reforming reactor 70 through stream 45.

Liquid methanol will be transferred from a tanker truck into a storage vessel 210. This storage vessel is preferably an existing storage vessel designed for a secondary feedstock during normal steady state operation, for instance, LPG. To ensure the methanol is free of impurities that may damage the reforming or pre-reforming catalyst, it is passed through a filter which removes the impurities (e.g., using activated carbon). This filter is sized for a minimum residence time of at least five minutes to ensure adequate contaminant removal.

Thereafter, the methanol feed pumps 220 are started to raise the pressure of the cleaned liquid methanol to that required for introduction into the steam stream 30 upstream of the reformer tubes 50. These pumps may either be custom designed for this service, or preferably be the same pumps used for elevating the pressure of a secondary feedstock in normal steady state operation, for instance, LPG.

During initial startup, isolation valves 320 and 330 are closed. Isolation valve 310 is opened to introduce methanol liquid 230 into the stream 30 through spray quench nozzle 35, where it vaporizes. The steam to methanol ratio will be between 20:1 and 30:1, preferably between 20:1 and 23:1, with liquid methanol flowrate being increased slowly from a starting value in the range of 500-1500 kg/hr to a desired flowrate in the range of 3000-6000 kg/hr over 3-12 hours.

The flow rate of stream 230 is controlled by control valve 340 via a ratio control loop. A flow ratio between stream 230 and steam stream 20 is calculated by ratio controller 360 which indicates to flow controller 370 the amount of liquid methanol to flow through control valve 340 based on the flow rate of steam stream 20 to meet the required steam to methanol ratio.

Reduction of the catalyst can be monitored by thermocouples, or more commonly by visually monitoring the color/temperature of the reformer tubes 50. Prior to introduction of the reduction fluid during initial catalyst reduction, the outside of the reformer tubes 50 visibly glow bright red in color. After introduction of the heated mixed steam and reduction fluid stream 45 to the inside of the reformer tubes 50, the endothermic reforming reaction will commence. The endothermic reaction will cause the tubes to cool, resulting in a visible darkening and blackening of outside tube color. Over a number of hours of introduction of the reduction fluid and steam, the reformer tubes 50 will visibly darken, with the darker color continuing across the length of the reformer tubes 50 as the reaction front reduces catalyst at that location. Catalyst reduction is complete when all reformer tubes have visibly darkened over their entire length, or after providing the reduction fluid and steam for the upper bound of the prescribed time range given by the catalyst vendor (e.g. 12 hours).

As hydrogen is generated at a flow greater than the minimum rate required to operate the pressure swing adsorption (PSA) unit 90 (which will take some number of hours), the PSA is started and provides hydrogen at the required purity to be stored in hydrogen receivers which may be used via nearly pure hydrogen recycle 95 as the reduction fluid for future steps, such as reduction of desulphurization catalyst contained in vessel 15, and/or pre-reformer catalyst. Once all process vessels and lines are prepared, isolation valve 330 is opened, the primary feed (e.g. naphtha) is introduced through feed stream 5, and the methanol feed 230 is reduced. Once the plant is operating fully on the primary feed and the methanol flow rate is reduced to zero, isolation valve 310 is closed, isolating stream 230 from spray quench nozzle 35, and the normal operating mode is commenced.

In the normal steady-state operation of this embodiment, a naphtha feedstock 5 is fed to the process plant 100. In the case of a naphtha feedstock, the naphtha is pumped as a liquid from a tank (not shown) to a pressure high enough to overcome process line pressure losses and reach the PSA unit 90 at a desired pressure (e.g. 200-400 psia). The liquid feedstock is mixed with nearly pure recycled hydrogen stream 95 before being vaporized and superheated in one or more heat exchangers 10, and then heated in one or more heat exchangers to reach the required temperature for hydrogenation and desulfurization 15 (e.g., 500-800 F, preferably ~700 F). After hydrogenation and desulfurization, the feed is mixed with a steam stream 20, preferably generated by the process and provided at a superheated temperature, to reach a desired steam to carbon ratio (e.g., 1.5-3.5, preferably ~2.8) to create a mixed feed stream.

The resulting mixed feed stream 30 is typically heated in one or more heat exchangers 40 to a desired inlet temperature for a steam methane reforming reactor. The heated mixed feed stream 45 flows through the reformer tubes 50 filled with a nickel-based catalyst that has been reduced during initial startup. Reformer inlet temperatures are in the range of 900-1300° F., preferably 1050-1200° F. The mixed feed undergoes an endothermic reforming reaction generating a synthesis gas containing hydrogen and carbon monoxide (CO).

This synthesis gas, exiting the reactor at a temperature range of 1400-1800° F., preferably 1550-1650° F., is cooled through one or more heat exchangers 60. Additionally, when greater recoveries of hydrogen are desired, one or more additional catalyst (e.g., iron oxide) containing reaction vessels 80 are utilized to perform an exothermic water gas shift reaction. The water gas shift reaction converts the majority of the CO to carbon dioxide (CO2) and additional hydrogen. The synthesis gas is cooled in one or more heat exchangers 10 and 110 to a desired inlet temperature for the pressure swing adsorption (PSA) unit 90 in the range of 80-120° F.

When products other than hydrogen are desired, other unit operations may be included. One example is additional equipment for greater carbon monoxide recovery which may include, but is not limited to, amine adsorption units, and cryogenic distillation based separations. A portion of the heat exchange within the process will typically include the generation of steam, typically for both use in the process and as an export product 120.

One method to control the temperature at the inlet to the reformer tubes 50 is by flowing liquid water 25 through the open isolation valve 320, and spraying this liquid water through spray quench nozzle 35 into the mixed feed stream 30 upstream of the reformer tubes 50. The mixed feed stream is cooled due to the natural evaporative cooling of this sprayed water stream. The inlet temperature to the reformer tubes 50 is monitored by temperature indicator 350 and a control loop determines the flow rate of liquid water to be flown through control valve 340 to achieve the desired temperature. This spray quench nozzle 35 is the same spray quench nozzle utilized for spraying methanol for catalyst reduction during initial startup. Preferably, this water addition is accounted for in the overall plant steam to carbon ratio.

The use of spray nozzles is not limited to temperature control of the steam methane reforming reactor. Similar spray nozzles may provide temperature control through cooling for various streams, including but not limited to pre-reformer inlet streams, as well as other process streams.

While the invention has been described in detail with reference to specific embodiments thereof, it will become apparent to one skilled in the art that various changes and modifications can be made, and equivalents employed, without departing from the scope of the appended claims.

What is claimed is:

1. A method of starting up an integrated hydrogen or syngas plant including a reactor having a catalyst therein, comprising:

a first step of providing a catalyst reduction fluid selected from methanol, ammonia, and urea, and introducing the catalyst reduction fluid into a steam stream through liquid spray quench nozzles;

introducing the mixture of catalyst reduction fluid and steam stream and reducing a catalyst disposed within the reactor, until the catalyst is reduced; and thereafter in a separate second step of admitting a reactor feedstock and steam stream into the reactor where reforming is carried out and wherein liquid water is introduced through the liquid spray quench nozzles utilized for introducing the mixture of catalyst reduction fluid into the steam stream in the first step as a means of controlling the temperature of a combined reactant feedstock and steam stream.

2. The method of claim 1, where the feedstock is selected from natural gas, naphtha and LPG.

3. The method of claim 1, where the reactor is a pre-reformer or a steam methane reformer having the catalyst therein.

4. The method of claim 1, wherein the catalyst is nickel-based.

5. The method of claim 1, wherein the temperature at an inlet of the reactor is in the range of 900–1300° F. during normal steady state operation the second step.

6. The method of claim 1, comprising: removing a synthesis gas at the outlet of the reactor during the second step at a temperature in the range of 1400–1800° F.

7. The method of claim 1, wherein a minimum steam to reductant molar ratio in the range of 20:1 to 30:1 is attained.

8. The method of claim 1, wherein a minimum steam to reductant molar ratio in the range of 20:1 to 23:1 is attained.

9. The method of claim 1, wherein the catalyst reduction fluid is stored in a vessel normally used for a plant feedstock.

10. The method of claim 1, wherein the catalyst reduction fluid is pumped from storage using a pump utilized in normal operations for a plant feedstock.

11. The method of claim 10, wherein the catalyst reduction fluid is further purified by routing said reductant fluid through an activated carbon bed filter.

12. The method of claim 1, wherein a steam to carbon ratio of the reactor feedstock and steam stream is in the range of about 1.5 to 3.5 during the second step.

* * * * *